United States Patent
Fujieda

(10) Patent No.: US 9,704,052 B2
(45) Date of Patent: Jul. 11, 2017

(54) IMAGE PROCESSING METHOD FOR CHARACTER RECOGNITION, CHARACTER RECOGNITION APPARATUS USING THIS METHOD, AND PROGRAM

(71) Applicant: OMRON Corporation, Kyoto-Shi, Kyoto (JP)

(72) Inventor: Shiro Fujieda, Kyoto (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 14/379,118

(22) PCT Filed: Nov. 28, 2012

(86) PCT No.: PCT/JP2012/080703
§ 371 (c)(1),
(2) Date: Aug. 15, 2014

(87) PCT Pub. No.: WO2013/132709
PCT Pub. Date: Sep. 12, 2013

(65) Prior Publication Data
US 2015/0023593 A1    Jan. 22, 2015

(30) Foreign Application Priority Data
Mar. 5, 2012  (JP) ................................. 2012-047897

(51) Int. Cl.
*G06K 9/34* (2006.01)
*G06K 7/10* (2006.01)
(Continued)

(52) U.S. Cl.
CPC ....... *G06K 9/3283* (2013.01); *G06K 9/00442* (2013.01); *G06K 9/4647* (2013.01); *G06K 2209/01* (2013.01)

(58) Field of Classification Search
None
See application file for complete search history.

(56) References Cited

U.S. PATENT DOCUMENTS 4,558,461 A * 12/1985 Schlang ............... G06K 9/3283
382/290
5,313,311 A * 5/1994 Brandkamp ............ G06T 3/608
358/448
(Continued)

FOREIGN PATENT DOCUMENTS

| JP | 10-69524 A | 3/1998 |
| JP | 2000-357287 A | 12/2000 |
| JP | 2009230605 A * | 10/2009 |

OTHER PUBLICATIONS

International Search Report for corresponding International Application No. PCT/JP2012/080703, mailed Jan. 15, 2013 (1 page).

*Primary Examiner* — Randolph I Chu
(74) *Attorney, Agent, or Firm* — Osha Liang LLP

(57) ABSTRACT

An image processing method of processing a gray-scale image of character strings arranged in a plurality of lines of text, for character recognition, includes setting at least a part of a range, in which the character strings in the gray-scale image area are distributed, as a search area, and setting, for each of a plurality of points arranged along one of two axes, representing coordinates in the image, corresponding to an arrangement of the line of text, a plurality of lines extending across the search area, with the point as a starting point, and accumulating, for each of the lines, pixel data in the line within the search area.

12 Claims, 9 Drawing Sheets

(51) Int. Cl.
  *G06K 9/32* (2006.01)
  *G06K 9/46* (2006.01)
  *G06K 9/00* (2006.01)

(56) References Cited

U.S. PATENT DOCUMENTS

| | | | | |
|---|---|---|---|---|
| 5,321,770 A * | 6/1994 | Huttenlocher | G06K 9/00463 | 382/174 |
| 5,369,714 A * | 11/1994 | Withgott | G06K 9/72 | 382/177 |
| 5,390,259 A * | 2/1995 | Withgott | G06F 17/211 | 382/173 |
| 5,491,760 A * | 2/1996 | Withgott | G06K 9/72 | 382/177 |
| 5,557,689 A * | 9/1996 | Huttenlocher | G06K 9/00859 | 382/174 |
| 5,640,466 A * | 6/1997 | Huttenlocher | G06K 9/00 | 382/177 |
| 5,687,253 A * | 11/1997 | Huttenlocher | G06K 9/6206 | 382/177 |
| 5,689,585 A * | 11/1997 | Bloomberg | G06K 9/00469 | 382/229 |
| 5,781,660 A * | 7/1998 | Nitta | G06K 9/3283 | 382/173 |
| 6,373,997 B1 * | 4/2002 | Wayner | G06K 9/3283 | 382/289 |
| 2002/0051575 A1 * | 5/2002 | Myers | G06K 9/3283 | 382/202 |
| 2005/0094897 A1 * | 5/2005 | Zuniga | G06K 9/3208 | 382/290 |
| 2006/0115140 A1 * | 6/2006 | Nakamura | G07D 5/005 | 382/136 |
| 2012/0294528 A1 * | 11/2012 | Li | H04N 1/387 | 382/173 |
| 2015/0281513 A1 * | 10/2015 | Ozawa | H04N 1/387 | 358/474 |

* cited by examiner

FIG9
(1)
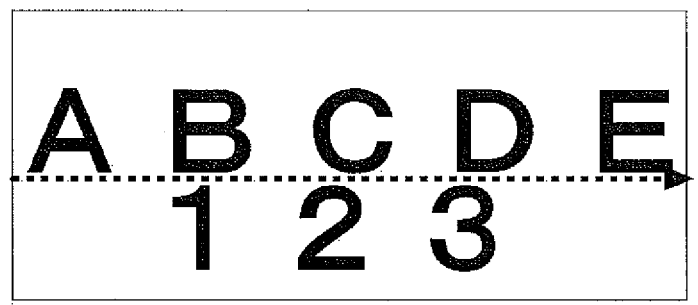
(2)
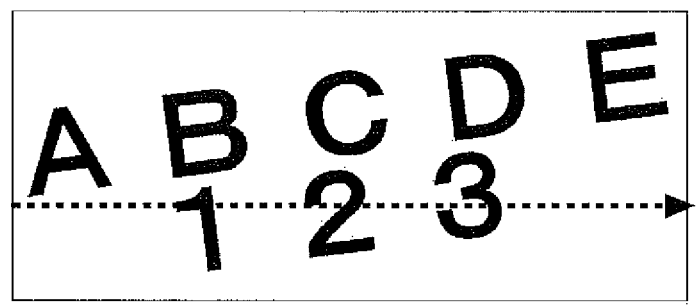

IMAGE PROCESSING METHOD FOR CHARACTER RECOGNITION, CHARACTER RECOGNITION APPARATUS USING THIS METHOD, AND PROGRAM

BACKGROUND

Technical Field

The present invention relates to processing for recognizing a character by image processing. The present invention particularly relates to a method of individually detecting a character string of each line of text from a gray-scale image of character strings arranged in a plurality of lines of text, and to a character recognition apparatus employing this method.

Related Art

In character recognition processing, generally, characters are individually cut out from a gray-scale image generated by capturing an image of a character string. Then, matching processing (model matching) using various character models is performed on each character, and thus the content of the character string is recognized.

To individually extract a character from an image of a character string, processing for projecting an image onto an axis, of two axes representing coordinates in an image, orthogonal to the longitudinal direction of the character string (direction in which the characters are arranged). Then, a range corresponding to a character string of each line of text is detected for each line of text from a projected pattern thus generated (this detection processing is hereinafter referred to as "processing for separating lines of text"). Furthermore, the processing for projecting an image onto the axis along the character string is performed for each extracted range. An area corresponding to each character (hereinafter referred to as "character area") is detected for each character from the projected pattern thus generated (see, for example, Patent Literatures 1 and 2).

Specifically, when a document in horizontal writing is read, with the axis in the lateral direction of the image defined as an x axis and the axis in the vertical direction of the image defined as a y axis, first, the processing for separating the lines of text is performed by the projection processing onto the y direction, and then the projection processing onto the x direction is performed for each line of text thus separated, to detect each character area. When the document in vertical writing is read, first, the processing for separating the lines of text by the projection processing onto the x direction is performed, and then the projection processing onto the y direction is performed for each separated line of text, to detect each character area.

In a case where the accumulated value of the gray level data is projected in each projection processing, a trough portion of the projected pattern is detected as the range corresponding to the character when the character portion is darker than the background, and a peak portion of the projected pattern is detected as the range corresponding to the character when the character portion is brighter than the background. In a case where an image is converted into binary, with the gray-level lower than a threshold set to "1" and the accumulated value of the binary data is projected, a peak portion of the projected pattern is detected as the range corresponding to the character when the character portion is darker than the background, and a trough portion of the projected pattern is detected as the range corresponding to the character when the character portion is brighter than the background.

PTL 1: Japanese Unexamined Patent Application Publication No. 1998-69524
PTL 2: Japanese Unexamined Patent Application Publication No. 2000-357287

SUMMARY

As described above, in the conventional processing for separating the lines of text, under a condition that an image of the character string, as the recognition target approximately in parallel with the x axis or the y axis, is captured, the image data in the line extending along one of the axes, close to the character string, is accumulated, and the accumulated value is projected onto the other axis. However, to correctly separate the character strings of the lines of text by such a method, the image capture location of a range, including the character string, needs to be prevented from overlapping the image capture location of the background portion.

When the character string is not inclined, as shown in FIG. 9(1), a line extending along the axis along the character string (y direction in the illustrated example), and passing between the character strings without crossing the character string, can be set. Thus, by projecting the image data onto the line, a local maximum value can be produced in the projected pattern, whereby the lines of text can be correctly separated.

However, when a rotationally offset image as the recognition target is input, as shown in FIG. 9(2), the line along the x axis direction cannot pass between the character strings. Thus, the boundary between the projected location of the range including the character string and the projected location of the background portion is unclear, whereby the lines of text fail to be separated, or the separating position is inaccurately set. In particular, when the space between the lines of text of the character strings is narrow, the line passing between the character strings might fail to be secured, even with a slight inclination, and thus the separation of the lines of text is more likely to fail.

One or more embodiments of the present invention largely improves the accuracy of the processing for separating the lines of text of character strings, by simple processing.

According to one or more embodiments of the present invention, at least a part of a range, in which character strings in a gray-scale image area are distributed, is set as a search area. For each of a plurality of points arranged along one of two axes (for example, y axis), representing coordinates in the image, corresponding to an arrangement of the line of text, a plurality of lines extending across the search area, with the point as a starting point, and accumulating, for each of the lines, image data in the line within the search area.

For each point as the starting point of the line, a maximum value of accumulated values in a group of lines set for the point is obtained, and at least one local maximum value in a distributed pattern generated by arranging the maximum values obtained for the points, in accordance with the arrangement of the points, is specified. Each line of text of the character strings in the image is detected based on a line, in which the accumulated value corresponding to the specified local maximum value is obtained, set as a line passing between the character strings.

For example, when the character strings in a two lines of text configuration shown in FIG. 9 is the recognition target, the search area is set to include a space between the character strings and a part of each character string. For each of a plurality of points arranged along the y axis direction, inside or outside the search range, a plurality of lines, extending across the search area in various directions with the point as a starting point, are set.

In a case where the accumulated value of the gray level within a range corresponding to the search area is calculated in each of the set lines, when a character portion is darker than a background in the image as the recognition target, a line with a higher percentage of pixels representing the background portion has a larger accumulated value. Thus, when the maximum values obtained for the points are arranged in accordance with the arrangement of the points, in a generated distributed pattern, a local maximum values is assumed to be produced at a position corresponding to a point from which the line passing between the character strings is set. In one or more embodiments of the present invention, processing of separating the lines of text is performed with the local maximum value specified, and the line, in which the accumulated value corresponding to the local maximum value is obtained, set as the line passing between the character strings. Thus, the character string of each line of text can be correctly detected.

When an image, in which the character portion is brighter than the background, is the recognition target, the image data is converted so that the higher brightness is directly related with a smaller gray level value, and then the method described above is performed. Thus, similarly, the character string of each line of text can be correctly detected. When the image data to be accumulated is binary image data, the image is converted to binary, in such a manner that the "1" is set to the character portion and "0" is set to the background portion. Thus, the effect similar to that described above can be obtained.

When the character strings of three or more lines of text is the recognition target, as in the above described case, for each of a plurality of points arranged along the axis, corresponding to an arrangement direction of the line of text, a plurality of lines extending across the search area are set. A plurality of local maximum values in the distributed pattern generated by arranging the maximum values of the accumulated values of the image data in a group of lines set for each point, in accordance with the arrangement of the points, are obtained. Then, each line, in which the accumulated value corresponding to the local maximum value is obtained, is set as the line passing between the character strings. Thus, lines of text can be correctly separated.

In the methods described above, the point as the starting point may be moved by one pixel, and the accumulated value may be obtained for each point, while sequentially changing the inclination of the line within a predetermined angel range. Each point in one side of the search range may be set as a starting point, and a line may be set between each starting point and each point in the opposite side.

The starting point in each processing needs not to be continuously disposed, and may be set at every few pixels, and a point outside the search area may be set as the starting point.

The processing of "arranging the maximum points obtained for the points in accordance with the arrangement of the points" may be regarded as projecting of the maximum values onto the axis along the arrangement of the points set as the starting point. The local maximum value in this array can be specified by a procedure of obtaining the maximum values of the accumulated values by repeating the processing for setting the line and accumulating the image data, and then projecting each of the maximum values onto the coordinates of the corresponding one of the points, and specifying the local maximum value from the distributed pattern thus generated.

However, this procedure needs not to be necessarily performed. When a range, in which the position between the lines of text varies, can be estimated in the processing of recognizing the character strings of the two lines of text configuration, the setting of the line and the accumulation of the pixel data may be repeated, and the maximum value of the accumulated value acquired during then may be specified, while changing the starting point of the line with the search area set to include the estimated range. Here, the line, in which the accumulated value corresponding to the specified maximum value is obtained, is set as the line passing between the character strings.

Also in one or more embodiments of the present invention, at least a part of a range, in which character strings in a gray-scale image area are distributed, is set as a search area. For each of a plurality of points arranged along one of two axes, representing coordinates in the image, corresponding to an arrangement of the line of text, a plurality of lines extending across the search area, with the point as a starting point, and accumulating, for each of the lines, pixel data in the line within the search area.

In the second image processing method, for each point as the starting point of the line, a minimum value of accumulated values in a group of lines set for the point is obtained, and at least one local minimum value in a distributed pattern generated by arranging the minimum values obtained for the points, in accordance with the arrangement of the points, is specified. Each line of text of the character strings in the image is detected based on a line, in which the accumulated value corresponding to the specified local minimum value is obtained, set as a line passing between the character strings.

The second method can be applied to a case where an gray-scale image, in which the character portion is brighter than the background, is the processing target and a case where a binary image, obtained by conversion in such a manner that "1" is set to the character portion and "0" is set to the background portion, is the processing target. In these cases, on the contrary to one or more of the above methods, a line with a higher percentage of pixels representing the background portion has a smaller accumulated value of the image data. The local minimum value in a distributed pattern generated by arranging the minimum values obtained for the points as the starting points of the lines, in accordance with the arrangement of the points, is specified. The line passing between the character strings is correctly specified by the local minimum value, and the character strings of the lines of text can be correctly separated.

In one or more embodiments of the present invention, after the character string of each line of text is detected, processing for projecting an image of the character string onto one of two axes (for example, x axis), representing coordinates in the image, not corresponding to the arrangement of the line of text, and processing for individually detecting a character in the character string, based on a result of the projection, are performed.

One or more of the embodiments described above can be applied to a scene where the character string as the recognition target is not largely inclined.

This is because when the inclination of the character string is not large, after the character strings are correctly separated, each character can be correctly detected by the processing of projecting the image onto an axis close to the direction of the character string, and the matching processing against the models can be performed without problem.

When the character string is likely to largely incline, one of the following two embodiments may be employed.

In a first embodiment, for each character string detected by the line passing through the character strings, processing for rotationally correcting an image of the character string, in such a manner that the line used for the detection extends along one of two axes, representing the coordinates in the image, not corresponding to the arrangement of the line of text, processing for projecting the corrected image onto the one of the two axes not corresponding to the arrangement of the line of text, and processing for individually detecting a character in the character string based on a result of the projection, are performed. Specifically, after each line of text is separated, the image is rotationally corrected in accordance with the inclination of the line of text, the corrected image is projected onto the axis along the character string, and each character is detected.

In a second embodiment, in the processing for detecting each line of text of the character strings in the image, an image as a processing target is rotationally corrected in such a manner that the line passing between the character strings extends along one of two axes, representing the coordinates in the image, not corresponding to the arrangement of the line of text, and then each line of text of the character string is detected based on the line passing between the character strings in the corrected image. Specifically, before lines of text are separated, the entire image of the range including the character string of each line of text is rotationally corrected, and then the lines of text are separated, the processing for projecting the corrected image onto the axis along the character string, and each character is detected.

In the first and second embodiments described above, the image is rotationally corrected based on the inclination of the line passing between the character strings, in such a manner that the character string extends along the axis onto which the projection is performed for cutting out a character. Thus, each character can be correctly detected. Furthermore, the character not rotationally offset can be matched against the models, whereby the accuracy and the efficiency of the recognition can be largely improved.

A character recognition apparatus according to one or more embodiments of the present invention has functions of inputting a gray-scale image generated by capturing an image of a character string, as a recognition target, cutting out each character in the character string in the image, and then matching each of cut out character against models registered in advance to recognize the each character A first character recognition apparatus employing the first image processing method includes: an area setting means configured to set a search area in the gray-scale image as the recognition target; an accumulation means configured to set, for each of a plurality of points arranged along one of two axes representing coordinates in the image, a plurality of lines extending across the search area with the point as a starting point, and accumulate, for each of the lines, pixel data in the line within the search area; a specification means configured to obtain, for each point as the starting point of the line, a maximum value of accumulated values in a group of lines set for the point, and specify a local maximum value in a distributed pattern generated by arranging the maximum values obtained for the points in accordance with the arrangement of the points; a character string detection means configured to detect each line of text of the character strings in the image based on a line, in which the accumulated value corresponding to the local maximum value specified by the specification means is obtained; and a character recognition means configured to individually cut out, for each character string detected by the character string detection means, a character in the character string, and perform matching processing against the models.

A second character recognition apparatus employing the second image processing method includes: an area setting means configured to set a search area in the gray-scale image as the recognition target; an accumulation means configured to set, for each of a plurality of points arranged along one of two axes representing coordinates in the image, a plurality of lines extending across the search area with the point as a starting point, and accumulate, for each of the lines, pixel data in the line within the search area; a specification means configured to obtain, for each point as the starting point of the line, a minimum value of accumulated values in a group of lines set for the point, and specify a local minimum value in a distributed pattern generated by arranging the minimum values obtained for the points in accordance with the arrangement of the points; a character string detection means configured to detect each line of text of the character strings in the image based on a line, in which the accumulated value corresponding to the local minimum value specified by the specification means is obtained; and a character recognition means configured to individually cut out, for each character string detected by the character string detection means, a character in the character string, and perform matching processing against the models.

According to the configurations of the first and the second character recognition apparatuses, the search area is set in the range in which the character strings in the image as the recognition target are distributed. One of two axes representing the coordinates in the image, corresponding to the arrangement of the line of text of the character string, as the direction in which the points as the starting points of the lines are arranged. Thus, the character string of each line of text can be correctly separated. Thus, the processing of cutting out a character and the processing of matching against the models are performed for each character string thus separated, whereby each character can be accurately recognized.

The first and the second apparatuses may be combined into one apparatus. Here, the area setting means and the accumulation means are each assumed to be combined into one unit. On the other hand, two modes are provided for each of the specification means, the character string detection means, and the character recognition means, and one of the modes is selected in accordance with dark/bright relationship between the character string and the background.

Furthermore, one or more embodiments of the present invention provides a program for setting a computer to have functions of the means of the first and the second character recognition apparatuses.

According to one or more embodiments of the present invention, the processing of separating a character string of each line of text from a gray-scale image of character strings arranged in a plurality of lines of text can be performed accurately with a simple procedure. Furthermore, even when the recognition target is rotationally offset character strings or character strings with a small space in between, the processing of separating the line of text can be stably performed, and character recognition accuracy can be improved.

BRIEF DESCRIPTION OF DRAWINGS

FIG. 9 is a diagram showing relationship between the direction of a projected line and an inclination of the character string for processing for separating lines of text

DETAILED DESCRIPTION

Figure 1:
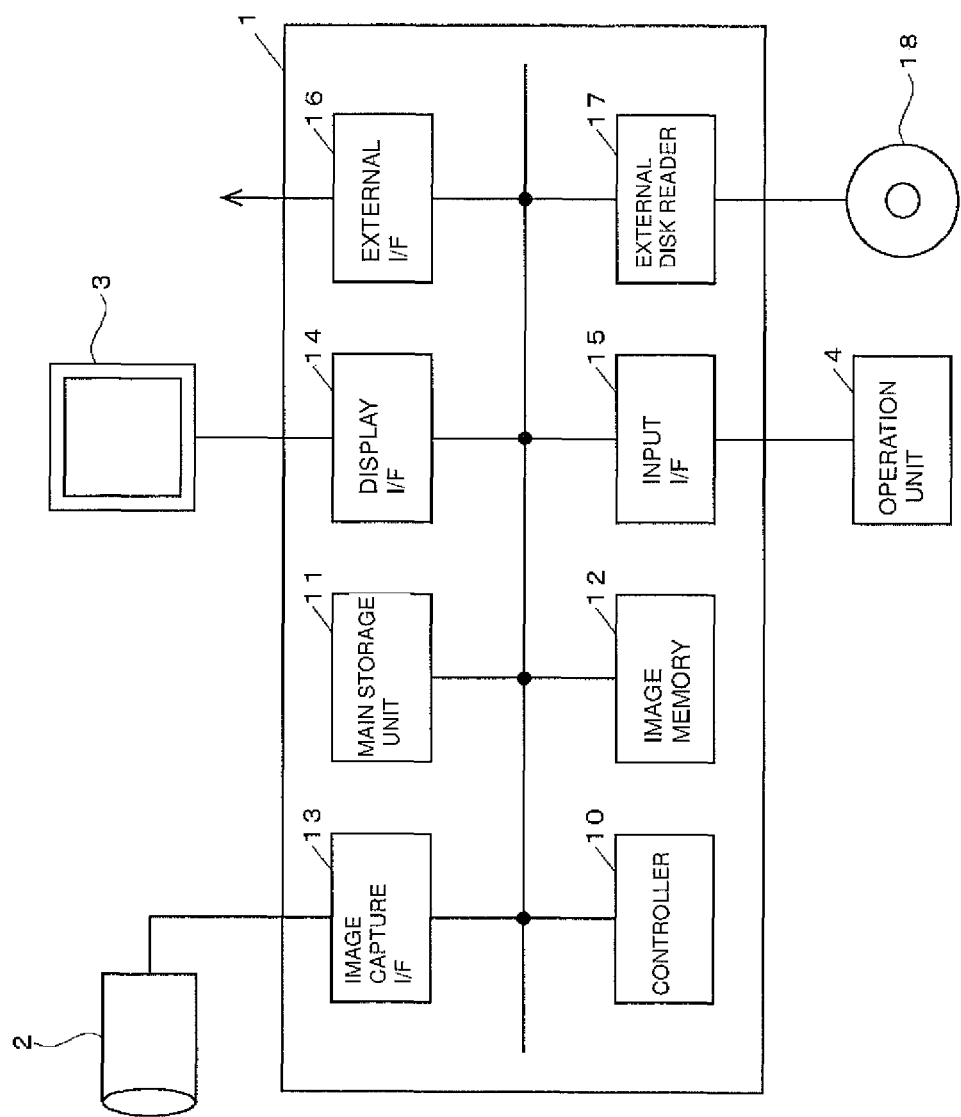
FIG. 1 is a block diagram showing a configuration example of a character recognition apparatus.

Embodiments of the present invention will be described with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention. FIG. 1 shows a configuration example of a character recognition processing apparatus according to one or more embodiments of the present invention.

The character recognition processing apparatus captures an image of a character string, reads a character in the image thus generated, and outputs the result of the reading. The character recognition processing apparatus includes a main body unit 1 including a controller 10, a camera 2 for the image capturing, a display unit 3, an operation unit 4, and the like. The display unit 3 is formed of a liquid crystal monitor, for example, and the operation unit 4 includes a mouse and a keyboard. The camera 2 may be replaced by a scanner device.

The main body unit 1 is a general-purpose computer (personal computer) and includes the controller 10 including a CPU, and further includes a main storage unit 11, an image memory 12, an image capture interface 13, a display interface 14, an input interface 15, an external interface 16, an external disk reader 17, and the like.

As an example, the main storage unit 11 can be a hard disk, and an image memory 12 can be a RAM board. In the main storage unit 11, a dedicated program read from an external disk 18 by the external disk reader 17, font data used for the character recognition processing, and the like are registered. An image output from the camera 2 is captured by the image capture interface 13 to be digitally converted, and the resultant image data is stored in the image memory 12.

The controller 10 is set to have a function of cutting out each character from the image stored in the image memory 12, and a function of matching the cut out character against various types of font data to recognize the character, with programs stored in the main storage unit 11. The controller 10 is also set to have a function as a graphical user interface to be provided to the user through these processing described above. With the graphical user interface, a screen including an image as a processing target is displayed on the display unit 3 through the display interface 14, and an operation through the operation unit 4 is received through the input interface 15.

Figure 2:
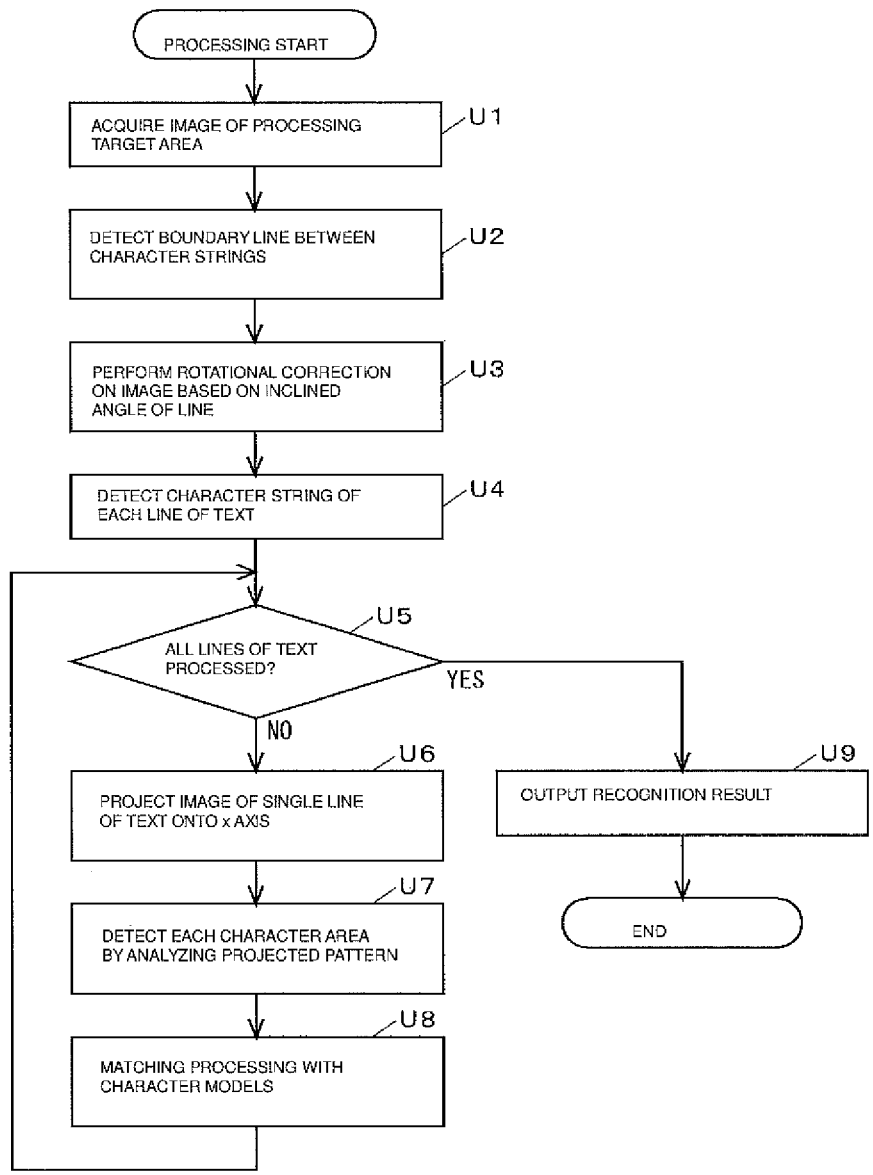
FIG. 2 is a flowchart showing a procedure of character recognition processing.

FIG. 2 shows a schematic procedure of processing performed by the controller 10 for the character recognition.

The processing starts when an operation of designating a processing target area in the image displayed on the screen is performed, and a reading operation is further performed. In response to the operations, the controller 10 performs processing for acquiring an image in the processing target area (Step U1) and detecting a line (hereinafter referred to as "boundary line") representing a boundary between character strings (Step U2).

As will be described in detail later, the boundary line is expressed by coordinates of one end point of the line and an angle $\theta$ (c with respect to the x axis) representing the inclination of the line. In Step U3, rotational correction is performed on the image based on the angle $\theta$, so that the boundary line becomes approximately parallel with the x axis direction. In Step U4, the corrected image is divided along the boundary line after the correction, and thus each line of text of character string is detected.

Thereafter, for each detected line of text, an image of a range including the character string in the line of text is projected onto the x axis (Step U6), and the projected pattern thus generated is analyzed so that an area (character area) corresponding to each character in the character string is individually detected (Step U7). Then, the content of the character is recognized by the matching processing for matching each extracted character against the character models based on the registered font data (Step U8).

When Steps U6, U7, and U8 are performed on all the lines of text, "YES" is determined in Step U5, and the processing proceeds to Step U9 where the recognition result is output. With the output, the processing corresponding to a reading instruction from the user is completed.

In the description above, the processing target area is set by the user. However, this should not be construed in a limiting sense. The processing target area may be automatically set to a range specified by reference data registered in advance, every time an image is captured. Alternatively, the entire generated image may be set as the processing target area.

Figure 3:
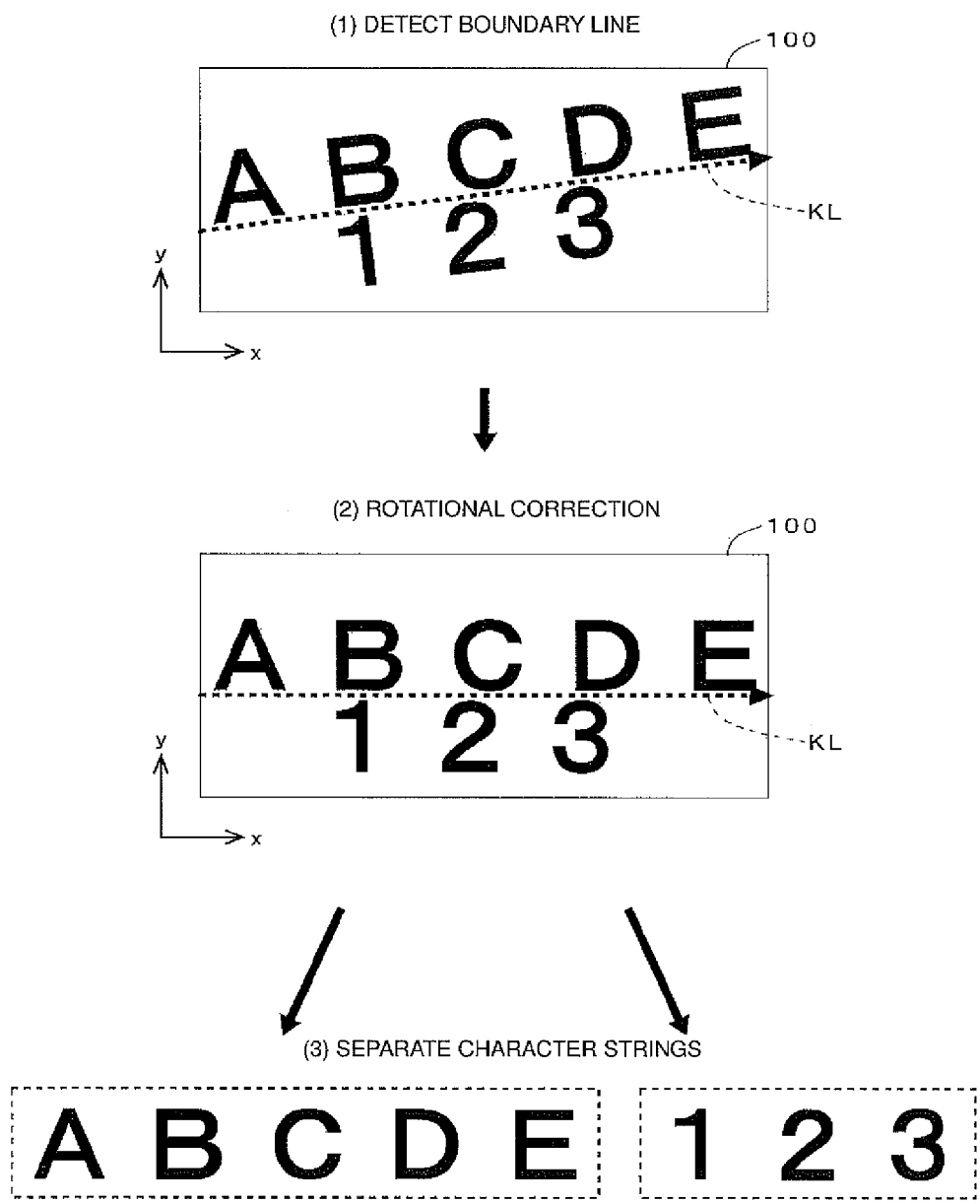
FIG. 3 is a diagram showing a specific example of each of processing for specifying a boundary line, processing of rotationally correcting an image, and processing of separating character strings.

FIG. 3 specifically shows a procedure from the detection of the boundary line to the processing for separating each line of text of the character strings (Steps U2, U3, and U4 in FIG. 2), in an exemplary case where the character strings of a two line of text configuration in horizontal writing are the recognition target. In the specific example in FIG. 3 and after, the direction from the left side to the right side in the figure is defined as a positive direction of the x axis, and the direction from the lower side to the upper side in the figure is defined as a positive direction of the y axis. The processing target area is denoted with a reference numeral 100.

In the example of FIG. 3, the character strings are rotationally offset largely from the x axis. In Step U2, a line KL, passing through a space between the character strings, can be accurately detected with the processing described later (FIG. 3(1)). The boundary line KL extends along the longitudinal direction of the character string. Thus, in Step U3, by rotationally correcting the image in such a manner that the boundary line KL becomes parallel to the x axis, the character strings also extends along the x axis as shown in FIG. 3(2). Then, in Step U4, the corrected image is divided along the line KL, and thus the lines of text of character strings can be correctly separated as shown in FIG. 3(3).

The rotational correction is not necessarily required. When the rotational angle of the boundary line KL, with respect to the x axis, is within an allowable value, the image may be divided along the boundary line KL without performing the rotational correction.

To separate the lines of text of character strings in horizontal writing, generally, an accumulated value of image data in a line along the x axis is projected onto the y axis. However, when the character string as the recognition target is inclined with respect to the x axis, the line passing between the character lines cannot be set (see FIG. 9(2) described above). Thus, a projected pattern, in which a character portion is clearly distinguished from a background portion, is difficult to generate.

Thus, in one or more embodiments of the present invention, a plurality of lines extending in various directions from each target point, which is each point in a predetermined range in a left side of the processing target area 100, are set. A gray-level accumulated value in each of the lines is calculated, and the maximum value of the gray-level accumulated values is obtained. An array, in which the maximum values of the target points are arranged in accordance with the arrangement of the target points, is generated. The local maximum value is detected from a distributed pattern of values in the array, and the line, in which the accumulated value corresponding to the local maximum value is obtained, is specified as the boundary line KL.

Figure 4:
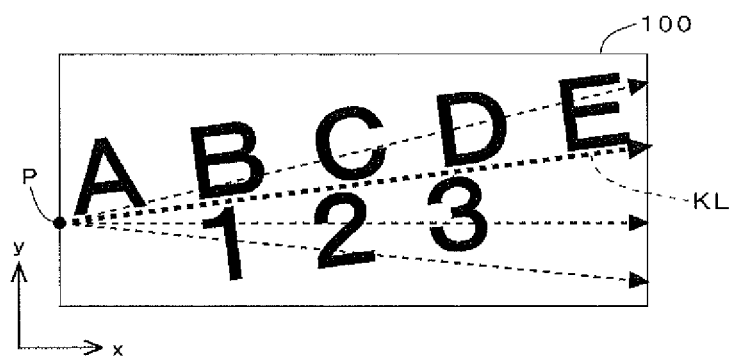
FIG. 4 is a diagram showing a concept of lines set from a single point.

In the gray-scale image, higher brightness is directly related with a larger gray-level value. Thus, when the gray-level accumulated value in a single line is obtained in an image, in which the character portion is darker than the background, a line with a higher percentage of pixels representing the background portion has a larger gray-level accumulated value. Thus, as shown in FIG. 4, when lines extending in various directions from a point P, in the left side of the processing target area 100, are set, and the gray-level accumulated value in each line is obtained, the gray-level accumulated value in the boundary line KL, passing between the character string without crossing the character string, is assumed to be larger than the gray-level accumulated values in other lines. All things considered, when the local maximum value in the array can be obtained, the boundary line KL can be specified from the local maximum value.

Specific processing in a case where the boundary line KL between the character strings is detected, for the character strings of the two line of text configuration shown in FIG. 3 and FIG. 4, is described below in detail.

Figure 5:
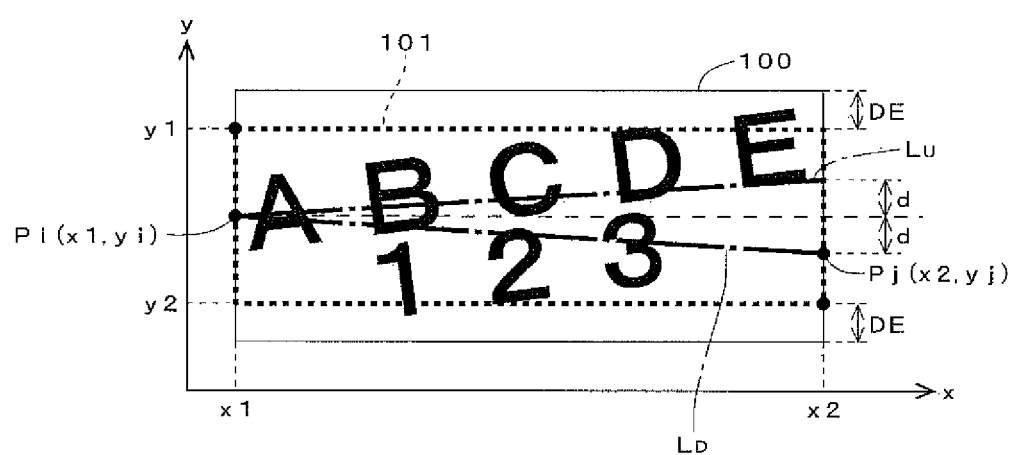
FIG. 5 is a diagram showing an example of a search area set for detecting the boundary line, together with parameters used for the detecting processing.

First, overview of the detection processing and parameters used in the processing are described by referring to FIG. 5.

In one or more embodiments of the present invention, in the range of the processing target area 100 in the y direction, coordinates of positions offset towards the inner side from the upper and lower edges by a predetermined distance DE are respectively defined as y1 and y2. An area 101 specified by the y coordinates and the x coordinates x1 and x2, respectively on left and right edges of the processing target area 100, is defined as a search area for searching the boundary line.

The portions, within DE from upper and lower edges, are excluded from the search area 101, to prevent a line, passing the blank spaces above and below the character string without crossing the character string, from being set. In one or more embodiments of the present invention, the user manually sets the search area 101, as in the case of the processing target area 100. However, this should not be construed in a limiting sense. The coordinates y1 and y2 may be registered in advance based on the expected variation of the position between the lines of text, and the search area 101 may be automatically set based on the registered data.

In one or more embodiments of the present invention, a point Pi in the left side of the search area 101 is defined as a target point Pi, and a line connecting the target point Pi with a point Pj in the right side is set. The y coordinate of each of the points Pi and Pj moves in the range between y1 and y2. In the description below, (x1, yi) represents the coordinates of the target point Pi, (x2, yj) represents the coordinates of the right side point Pj, and d represents the absolute value of the difference between yi and yj. The point Pj is referred to as "end point (of the line) Pj", and d is referred to as "displacement amount".

When yj=y1+d holds true, the line upward to the right, represented by a line $L_U$ in the figure, is set. When yj=y1−d holds true, the line downward to the right, represented by a line $L_D$ in the figure, is set.

Furthermore, the maximum value of the gray-level accumulated values obtained for the target point Pi in each processing is stored in an array MAX(i), and the displacement amount d or −d obtained when the line, in which the maximum value MAX(i) is obtained, is stored in the array D(i).

Figure 6:
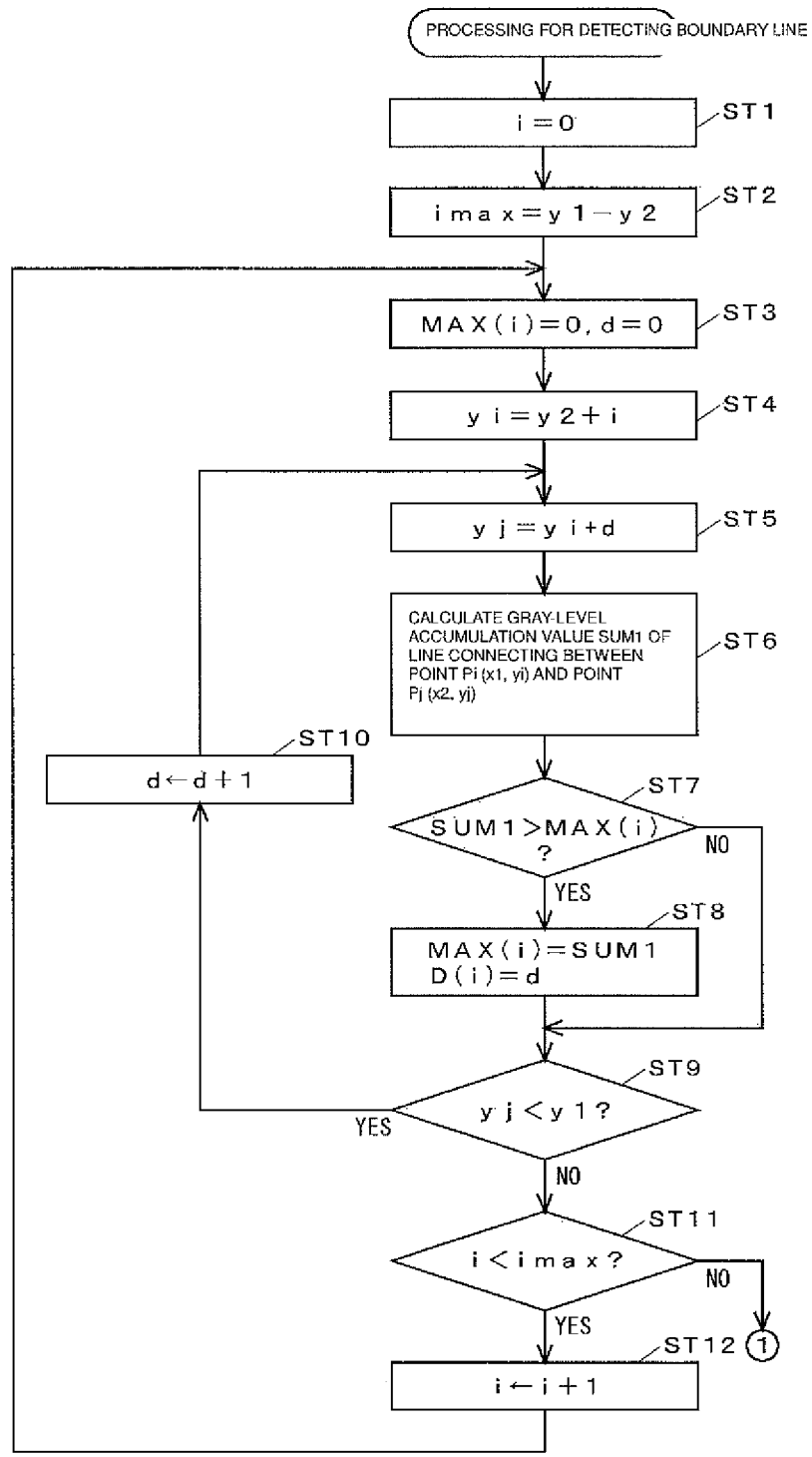
FIG. 6 is a flowchart showing a first half of the processing for detecting the boundary line.
Figure 7:
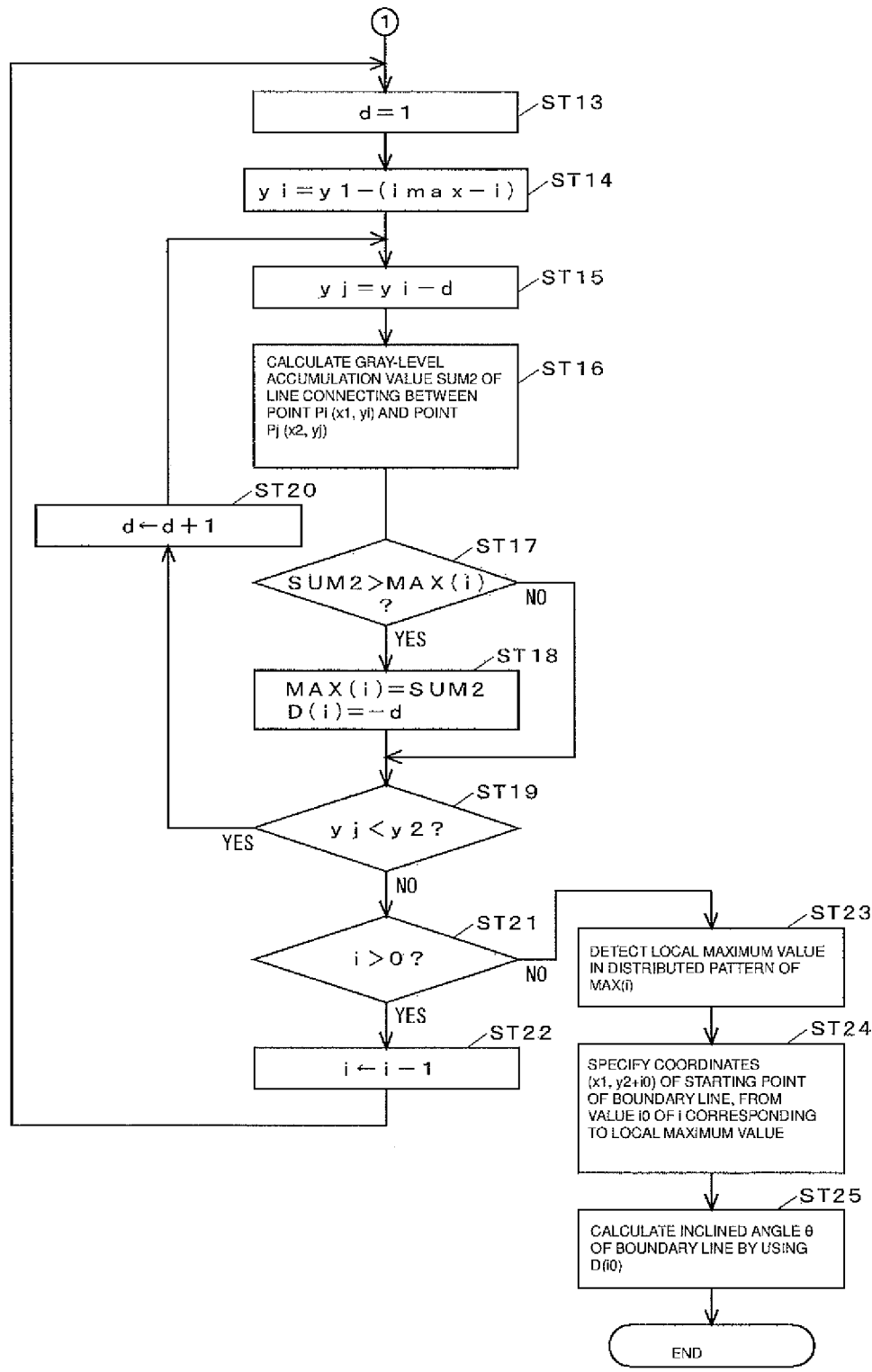
FIG. 7 is a flowchart showing a second half of the processing for detecting the boundary line.

FIGS. 6 and 7 show a detailed procedure of the processing (Step U2 in FIG. 3) for detecting the boundary line with the parameters described above.

In the description below, the flow of the processing is described by referring to step signs (ST1 to ST24) in each figure.

In the processing, 0 is set as an initial value of a variable i indicating the target point Pi (Step ST1). Then, the difference (y1−y2) between y1 and y2 is set as the maximum value imax of i (Step ST2), and the processing enters the loop in Steps ST3 to ST12, which will be hereinafter referred to as "first half loop".

In the first half loop, 0 is set as the initial value of each of MAX(i) specified by the current value of i, and of the displacement amount d (Step ST3). Furthermore, y2+i is set as the y coordinate yi of the target point Pi (Step ST4), and yi+d is set as the y coordinate yj of the end point Pj (Step ST5). Because i and d are 0 immediately after the first half loop has started, yi=yj=y2 holds true.

When the values of yi and yj are determined, in Step ST6, the line connecting between the point Pi positioned at the coordinates (x1, yi) and the point Pj positioned at the coordinates (x2, yj) is set based on the y coordinates, and a gray-level accumulated value SUM1 in the line is calculated.

When the gray-level accumulated value SUM1 thus calculated is larger than MAX(i), "YES" is determined in Step ST7. When "YES" is thus determined, in Step ST8, the maximum value MAX(i) is changed to SUM1 and the current value of d is stored in D(i). When SUM1 thus calculated is not larger than MAX(i), "NO" is determined in Step ST7, and thus Step ST8 is skipped.

Thereafter, the value of d is incremented by 1 until yi reaches y1 (Steps ST9 and ST10), and with the value of d, the end point Pj is moved upward by one pixel (Step ST5). Then, the line connecting between the target point Pi and the end point Pj is set, and the gray-level accumulated value SUM1 is obtained (Step ST6). When the value of SUM1 is larger than the maximum value MAX(i), MAX(i) and D(i) are updated (Steps ST7 and ST8).

In this series of processing, in Step ST6, performed for the first time (when d=0), the line in parallel with the x axis is set from the target point Pi. Thereafter (when d>1), the line extending upward to the right from the target point Pi is set. The maximum value of the gray-level accumulated values in the lines is stored in MAX(i). A larger value of d is directly related to the larger inclination of the set line.

When the y coordinate yj of the end point Pj is set to the upper limit y2 and thus the processing for the end point is completed, the value of i is incremented by 1 in Step ST12. Then, the processing returns to ST3, and MAX(i) specified by the updated i is set to the initial value 0, and the displacement amount d is reset to 0. In Step ST4, the updated i is used, and the target point Pi is moved upward by one pixel.

Thereafter, for the new target point Pi, the line connecting between the points Pi and Pj is set while moving the end point Pj upward by one pixel through the procedure that is the same as the above described procedure, and the gray-level accumulated value in the line is obtained. The maximum value MAX(i) and D(i) of each point are updated as appropriate (Steps ST5 to ST10).

Thereafter, in a similar manner, the first half loop is repeated while changing the combination between the target point Pi and the end point Pj with the values of i and d. Through this processing, for each point positioned in the left side of the search area 101, the lines extending in parallel to the x axis and upward to the right from the point are set (when i=imax, only a single line parallel with the x axis is set). Then, the maximum value of the gray-level accumulated values obtained in a group of lines from each point is stored in MAX(i), and the displacement amount d used to set the line, in which the maximum value MAX(i) is obtained, is stored in D(i).

When i=imax is achieved and thus the processing for yi (yi=y1) specified by this i is completed, the first half loop is completed ("NO" in ST11), and the processing enters the loop in Steps ST13 to ST22 in FIG. 7, which will be hereinafter referred to as "second half loop".

In the second half loop, the displacement amount d is set to 1 (ST13), the y coordinate yi of the target point Pi is set to y1−(imax−i) (ST14), and the y coordinate yj of the end point Pj is set to yi−d (ST15). Immediately after the second half loop has started, i=imax holds true, and thus yi=y1, and yi=y1−1 hold true.

In Step ST16, the line connecting between the target point Pi (x1, yi) and the end point Pj (x2, yj) specified by the above described setting is set, and a gray-level accumulated value SUM2 in the line is calculated. When the gray-level accumulated value SUM2 is larger than MAX(i), "YES" is determined in Step ST17. When "YES" is thus determined, in Step ST18, the value of the maximum value MAX(i) is changed to SUM2, and D(i) is set to −d. When SUM2 is not larger than MAX(i), "NO" is determined in Step ST17, and thus Step ST18 is skipped.

Thereafter, the value of d is incremented by 1 (Steps ST19 and ST20), and with this d, yj is updated (Step ST15). Then, Steps ST16 to ST18 are performed. Every time Step ST16 is performed, the line extending downward to the right from the target point Pi is set, and the inclination of the line gradually increases.

When yj is set to the lower limit y2 and thus the processing for yj is completed, "NO" is determined in Step ST19. In response to this, the processing proceeds from Step ST21 to Step ST22, in which i is decremented by 1, and then the processing returns to Step ST13. In Step ST13, d is reset to 1, and in subsequent Step ST14, the target point Pi moves downward by one pixel.

Thereafter, the loop in Steps ST15 to ST20 is repeated for the new target point Pi, while changing the coordinates of the end point Pj.

As described above, in the second half loop, target point Pi, which has reached the position (x1, y1) in the first half loop, is moved downward by one pixel, and a plurality of lines extending downward to the right is set for the target point Pi in each loop. Then, the gray-level accumulated value in each line is calculated. When the gray-level accumulated values include a value larger than the maximum value MAX(i) obtained in the first half loop, the maximum value MAX(i) is updated by this gray-level accumulated value. The displacement amount −d used for setting the line, in which the maximum value MAX(i) is obtained, is stored in D(i).

As described above, the first half loop in ST3 to ST12 and the second half loop in ST13 to ST22 are performed on each point within a range from the coordinate y1 to the coordinate y2 in the left side of the processing target area 100. Thus, for each point, the highest value of the gray-level accumulated values in the group of lines set for the point as the starting point, is stored in MAX(i), and the displacement amount used for setting the line, in which the highest gray-scale level accumulated value is obtained, is stored in D(i).

When MAX(i) and D(i) for each point are determined, Steps ST23, ST24, and ST25 are performed in this order.

In Step ST23, the local maximum value in the distributed pattern represented by the array MAX(i) is detected. In Step ST24, with a value $i_0$ of i, corresponding to the detected local maximum value, the coordinates (x1, y2+$i_0$) of the starting point of the line, in which the local maximum value is obtained, are specified.

In Step ST25, the angle θ representing the inclination of the line, in which the local maximum value is obtained, is calculated by the following calculation using the displacement amount D($i_0$) corresponding to $i_0$.

$$\theta = \arctan\frac{D(io)}{x2 - x1} \quad \text{[Formula 1]}$$
$$\text{when } D(i_0) \geq 0$$

$$\theta = 360° - \arctan\frac{D(io)}{x2 - x1}$$
$$\text{when } D(i_0) < 0$$

By processing the image shown in FIG. 5 with the processing shown in FIGS. 6 and 7, all the combinations, between the points in the left side and the points in the right side of the search area 101, are obtained. In the group of lines formed by the combinations, the line passing through the gap between the character strings has the highest gray-level accumulated value, and thus is specified as the boundary line KL. Furthermore, the coordinates of the starting point of the boundary line KL and the inclined angle θ of the line are obtained. With the coordinates and the inclined angle, the calculation for the rotational correction of the image or the processing for separating the lines of text can be performed.

Modifications of one or more of the embodiments described above are described below.

(1) First of all, when the lines are set, all the combinations, between the points in the left side and the points in the right sides of the search area 101, may not necessarily be obtained. For example, when the upper limit of the inclination angle of the character string as the recognition target can be estimated, the range of the displacement amount d can be set in accordance with the upper limit angle, and the end point Pj may be moved in the displacement amount within the range up to the upper limit value. In this case, the contents of the determination in Steps ST19 and ST20 are changed to the comparison between d and the upper limit value, and the value of d may be incremented in Steps ST10 and ST20 until d reaches the upper limit value.

(2) In the procedures in FIGS. 6 and 7, the position, to which the end point Pj moves, is limited within the search area 101. Alternatively, as described in (1), when the setting range of the line is determined with the displacement amount d as an index, the position of the end point of the line may be outside the search area. Thus, the boundary line can be correctly specified even in a case where the character string is largely inclined or the search area 101 does not have a sufficient width.

(3) When only the character strings of two lines of text configuration are set as the recognition target, instead of obtaining the maximum value of the gray-level accumulated values for each target point, and obtaining the local maximum value in the array thereof, the maximum value of all the gray-level accumulated values may be obtained while setting the lines for each target point and calculating the gray-level accumulated value in the line.

Figure 8:
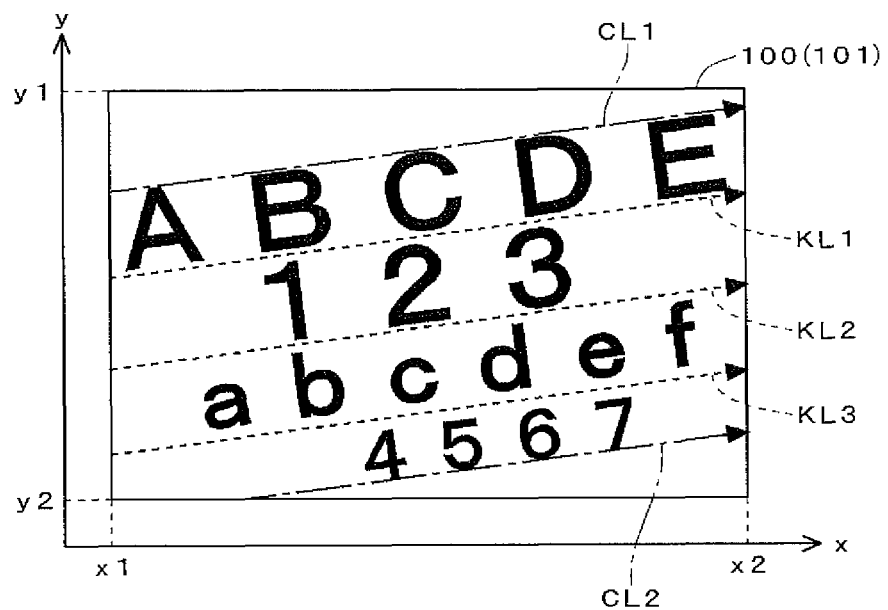
FIG. 8 is a diagram showing an example where the boundary line is detected, with the entire processing target area set as the search area.

(4) In one or more of the embodiments described above, the search area 101 is defined by positions offset towards the inner side, from the upper and lower edges of the processing target area, by DE, to prevent the line from being set in the empty space above and below the character strings of the two lines of text configuration, thereby preventing a large gray-level accumulated value from being calculated in the line. When the recognition target is character strings of any other number of lines of text, the entire processing target area 100 may be set as the search area 101 as shown in FIG. 8. Here, a large value representing the empty space might be produced at an end portion of the distributed pattern of MAX(i). When this happens, a boundary position between the range, in which large values are distributed, and an adjacent range, in which small values are distributed, is detected, and all the local maximum values produced in the range on the inner side of the boundary position are detected. For each local maximum value, the line, in which the accumulated value corresponding to the local maximum value is obtained, is specified. With this method, all the lines, such as KL1, KL2, and KL3 in FIG. 8, passing between character strings can be detected. By further specifying the line, in which the accumulated value corresponding to the boundary position is obtained, the upper and lower edges of the range, in which the character strings are distributed, can be detected as illustrated by CL1 and CL2 in FIG. 8.

(5) As in the example of FIG. 8, when a plurality of boundary lines are detected, the mean value of the rotation angles of the boundary lines may be used for the rotational correction of the image. However, this should not be construed in a limiting sense. The image of the character strings may be separated into lines of text along the boundary lines. Then, the rotational correction may be performed on each line of text based on the rotational angle of the upper or lower boundary line.

(6) In the procedures shown in FIGS. 6 and 7, the target is the image in which the character portion is darker than the background. When an image, in which the character portion is brighter than the background, is the recognition target, the image is converted so that the lower brightness is directly related with a larger gray-level value. When the image is not converted, in the processing for each target point, the minimum value of the gray-level accumulated values calculated in the group of set lines is obtained. Then, the local minimum value, in the distributed pattern represented by an array of the minimum values, is specified, and the line, in which the accumulated value corresponding to the local minimum value is obtained, is set as the boundary line.

(7) In one or more of the embodiments described above, the gray-level accumulated value is obtained for each set line. However, this should not be construed in a limiting sense. The image in the processing target area may be converted to binary, and the accumulated value of binary data in the line may be obtained. For example, when the image is converted to binary, in such a manner that the "1" is set to the character portion and "0" is set to the background portion, for each target point, the minimum value of the accumulated values calculated for the point is obtained. Then, the local minimum value, in the distributed pattern represented by an array of the minimum values, is specified, and the line, in which the accumulated value corresponding to the local minimum value is obtained, is set as the boundary line. On the contrary, when the image is converted into binary, in such a manner that the "0" is set to the character portion and "1" is set to the background portion, for each target point, the maximum value of the accumulated values calculated for the point is obtained. Then, the local maximum value, in the distributed pattern represented by an array of the maximum values, is specified, and the line, in which the accumulated value corresponding to the local maximum value is obtained, is set as the boundary line As described above, with the processing for detecting the boundary line of one or more embodiments of the present invention, the line passing between the character strings can be accurately detected, even when the character string as the recognition target is rotationally offset. Thus, the processing for cutting out a character and the matching processing are performed after the image of each line of text is corrected, and thus the recognition accuracy of the character can be largely improved.

With the processing for detecting the boundary line, the processing for separating the lines of text can be stably performed even when the character strings with a small space between the lines are the recognition target, without being affected by the slight rotational offset of the character string.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

REFERENCE SIGNS LIST 1 main body unit
2 camera
10 controller
11 main storage unit
100 processing target area
101 search area
Pi target point
Pj end point $L_U$, $L_D$ line in which gray-level accumulated value is calculated
KL, KL1, KL2, KL3 boundary line

The invention claimed is:

1. An image processing method of processing a gray-scale image of character strings arranged in a plurality of lines of text, for character recognition, the method comprising:
   setting at least a part of a range of a target area, in which the character strings in the gray-scale image area are distributed, as a search area;
   setting, for each of a plurality of points arranged along one of two axes, representing coordinates in the image, corresponding to an arrangement of the line of text, a plurality of lines extending across the search area, with the point as a starting point, and accumulating, for each of the lines, pixel data in the line within the search area;
   obtaining, for each point as the starting point of the line, a maximum value of accumulated values in a group of lines set for the point, and specifying at least one local maximum value in a distributed pattern generated by arranging the maximum values obtained for the points, in accordance with the arrangement of the points; and
   detecting each line of text of the character strings in the image based on a line, in which the accumulated value corresponding to the specified local maximum value is obtained, set as a line passing between the character strings,
   wherein the search area is an inner area of the target area offset by a first predetermined distance above the search area and a second predetermined distance below the search area,
   wherein an area above the first predetermined distance and an area below the second predetermined distance are blank space.

2. An image processing method of processing a gray-scale image of character strings arranged in a plurality of lines of text, for character recognition, the method comprising:
   setting at least a part of a range of a target area, in which the character strings in the gray-scale image area are distributed, as a search area;
   setting, for each of a plurality of points arranged along one of two axes, representing coordinates in the image, corresponding to an arrangement of the line of text, a plurality of lines extending from the point and across the search area, and accumulating, for each of the lines, pixel data in the line within the search area;
   obtaining, for each point as a starting point of the line, a minimum value of accumulated values in a group of lines set for the point, and specifying at least one local minimum value in a distributed pattern generated by arranging the minimum values obtained for the points, in accordance with the arrangement of the points; and
   detecting each line of text of the character strings in the image based on a line, in which the accumulated value corresponding to the specified local minimum value is obtained, set as a line passing between the character strings,
   wherein the search area is an inner area of the target area offset by a first predetermined distance above the search area and a second predetermined distance below the search area,
   wherein an area above the first predetermined distance and an area below the second predetermined distance are blank space.

3. The image processing method for character recognition according to claim 1, further comprising:
   performing, for each character string detected by the line passing through the character strings:
   projecting an image of the character string onto one of the two axes, representing the coordinates in the image, not corresponding to the arrangement of the line of text, and
   individually detecting a character in the character string, based on a result of the projection.

4. The image processing method for character recognition according to claim 1, further comprising:
   performing, for each character string detected by the line passing through the character strings:
   rotationally correcting an image of the character string, in such a manner that the line used for the detection extends along one of the two axes, representing the coordinates in the image, not corresponding to the arrangement of the line of text,
   projecting the corrected image onto the one of two axes not corresponding to the arrangement of the line of text, and
   individually detecting a character in the character string based on a result of the projection.

5. The image processing method for character recognition according to claim 1,
   wherein, in the detecting each line of text of the character strings in the image, an image as a processing target is rotationally corrected in such a manner that the line passing between the character strings extends along one of the two axes, representing the coordinates in the image, not corresponding to the arrangement of the line of text, and then each line of text of the character strings is detected based on the line passing between the character strings in the corrected image, and
   wherein, for each character string detected by the line passing through the character strings, projecting an image of the character string onto the one of two axes not corresponding to the arrangement of the line of text, and individually detecting a character in the character string based on a result of the projection.

6. A character recognition apparatus configured to input a gray-scale image generated by capturing an image of a character string, as a recognition target, cut out each character in the character string in the image, and then match each cut out character against models registered in advance to recognize the each character, the apparatus comprising:
   an area setting unit that sets a search area from a target area in the gray-scale image as the recognition target;
   an accumulator that sets, for each of a plurality of points arranged along one of two axes representing coordinates in the image, a plurality of lines extending across the search area with the point as a starting point, and accumulates, for each of the lines, pixel data in the line within the search area;
   a specification unit that obtains, for each point as the starting point of the line, a maximum value of accumulated values in a group of lines set for the point, and specifies a local maximum value in a distributed pattern generated by arranging the maximum values obtained for the points in accordance with the arrangement of the points;
   a character string detector that detects each line of text of the character strings in the image based on a line, in which the accumulated value corresponding to the local maximum value specified by the specification unit is obtained; and
   a character recognition unit that individually cuts out, for each character string detected by the character string detector, a character in the character string, and performs matching processing against the models, wherein the search area is an inner area of the target area offset by a first predetermined distance above the search area and a second predetermined distance below the search area, wherein an area above the first predetermined distance and an area below the second predetermined distance are blank space.

7. A character recognition apparatus configured to input a gray-scale image generated by capturing an image of a character string, as a recognition target, cut out each character in the character string in the image, and then match each cut out character against models registered in advance to recognize the each character, the apparatus comprising:

an area setting unit that sets a search area from a target area in the gray-scale image as the recognition target;

an accumulator that sets, for each of a plurality of points arranged along one of two axes representing coordinates in the image, a plurality of lines extending across the search area with the point as a starting point, and accumulates, for each of the lines, pixel data in the line within the search area;

a specification unit that obtains, for each point as the starting point of the line, a minimum value of accumulated values in a group of lines set for the point, and specifies a local minimum value in a distributed pattern generated by arranging the minimum values obtained for the points in accordance with the arrangement of the points;

a character string detector that detects each line of text of the character strings in the image based on a line, in which the accumulated value corresponding to the local minimum value specified by the specification unit is obtained; and a character recognition unit that individually cuts out, for each character string detected by the character string detector, a character in the character string, and perform matching processing against the models, wherein the search area is an inner area of the target area offset by a first predetermined distance above the search area and a second predetermined distance below the search area, wherein an area above the first predetermined distance and an area below the second predetermined distance are blank space.

8. A program stored on a non-transitory computer readable medium for causing a computer to operate as a character recognition apparatus configured to input a gray-scale image generated by capturing an image of a character string, as a recognition target, cut out each character in the character string in the image, and then matching each cut out character against models registered in advance to recognize the each character, the program causing the computer to perform:

setting a search area from a target area in the gray-scale image as the recognition target;

setting, for each of a plurality of points arranged along one of two axes representing coordinates in the image, a plurality of lines extending across the search area with the point as a starting point;

accumulating, for each of the lines, pixel data in the line within the search area;

obtaining, for each point as the starting point of the line, a maximum value of accumulated values in a group of lines set for the point;

specifying a local maximum value in a distributed pattern generated by arranging the maximum values obtained for the points in accordance with the arrangement of the points;

detecting each line of text of the character strings in the image based on a line, in which the accumulated value corresponding to the specified local maximum value is obtained;

individually cutting out, for each detected character string, a character in the character string; and performing matching processing against the models, wherein the search area is an inner area of the target area offset by a first predetermined distance above the search area and a second predetermined distance below the search area, wherein an area above the first predetermined distance and an area below the second predetermined distance are blank space.

9. A program stored on a non-transitory computer readable medium for causing a computer to operate as a character recognition apparatus configured to input a gray-scale image generated by capturing an image of a character string, as a recognition target, cut out each character in the character string in the image, and then matching each of cut out character against models registered in advance to recognize the each character, the program causing the computer to perform:

setting a search area from a target area in the gray-scale image as the recognition target;

setting, for each of a plurality of points arranged along one of two axes representing coordinates in the image, a plurality of lines extending across the search area with the point as a starting point;

accumulating, for each of the lines, pixel data in the line within the search area;

obtaining, for each point as the starting point of the line, a minimum value of accumulated values in a group of lines set for the point;

specifying a local minimum value in a distributed pattern generated by arranging the minimum values obtained for the points in accordance with the arrangement of the points;

detecting each line of text of the character strings in the image based on a line, in which the accumulated value corresponding to the specified local minimum value is obtained;

individually cutting out, for each detected character string, a character in the character string; and performing matching processing against the models, wherein the search area is an inner area of the target area offset by a first predetermined distance above the search area and a second predetermined distance below the search area, wherein an area above the first predetermined distance and an area below the second predetermined distance are blank space.

10. The image processing method for character recognition according to claim 1, further comprising:

performing, for each character string detected by the line passing through the character strings:

projecting an image of the character string onto one of the two axes, representing the coordinates in the image, not corresponding to the arrangement of the line of text, and individually detecting a character in the character string, based on a result of the projection.

11. The image processing method for character recognition according to claim 2, further comprising:
performing, for each character string detected by the line passing through the character strings:
rotationally correcting an image of the character string, in such a manner that the line used for the detection extends along one of the two axes, representing the coordinates in the image, not corresponding to the arrangement of the line of text,
projecting the corrected image onto the one of two axes not corresponding to the arrangement of the line of text, and
individually detecting a character in the character string based on a result of the projection.

12. The image processing method for character recognition according to claim 2,
wherein, in the detecting each line of text of the character strings in the image, an image as a processing target is rotationally corrected in such a manner that the line passing between the character strings extends along one of the two axes, representing the coordinates in the image, not corresponding to the arrangement of the line of text, and then each line of text of the character strings is detected based on the line passing between the character strings in the corrected image, and
wherein, for each character string detected by the line passing through the character strings, projecting an image of the character string onto the one of two axes not corresponding to the arrangement of the line of text, and individually detecting a character in the character string based on a result of the projection.

* * * * *